(12) United States Patent
Benckenstein, Jr. et al.

(10) Patent No.: US 7,570,010 B2
(45) Date of Patent: Aug. 4, 2009

(54) SOLAR PANEL WITH PULSE CHARGER

(75) Inventors: Claude Leonard Benckenstein, Jr., Sugar Land, TX (US); Dean Perkins, Tomball, TX (US)

(73) Assignee: Southwest Electronic Energy Corporation, Stafford, TX (US)

( * ) Notice: Subject to any disclaimer, the term of this patent is extended or adjusted under 35 U.S.C. 154(b) by 338 days.

(21) Appl. No.: 11/560,288

(22) Filed: Nov. 15, 2006

(65) Prior Publication Data

US 2009/0015191 A1 Jan. 15, 2009

Related U.S. Application Data

(63) Continuation-in-part of application No. 11/293,432, filed on Dec. 2, 2005, now Pat. No. 7,279,867.

(51) Int. Cl.
*H02J 7/00* (2006.01)
*G05F 1/00* (2006.01)

(52) U.S. Cl. ................. 320/101; 320/112; 320/116; 320/117; 320/124; 320/128; 323/272

(58) Field of Classification Search ............. 320/101, 320/116, 117, 120, 124, 118, 122, 128, 150
See application file for complete search history.

(56) References Cited

U.S. PATENT DOCUMENTS

| | | | |
|---|---|---|---|
| 3,816,805 A | 6/1974 | Terry | |
| 3,886,426 A | 5/1975 | Daggett | |
| 4,851,756 A | 7/1989 | Schaller et al. | |
| 5,332,927 A | 7/1994 | Paul et al. | |
| 5,461,264 A | 10/1995 | Yang | |
| 5,479,083 A | 12/1995 | Brainard | |
| 5,619,417 A | 4/1997 | Kendall | |
| 5,736,833 A | 4/1998 | Farris | |
| 5,900,717 A | 5/1999 | Lee | |
| 5,952,815 A * | 9/1999 | Rouillard et al. | 320/116 |
| 5,973,476 A | 10/1999 | Irvin | |
| 6,037,750 A | 3/2000 | Von Novak | |
| 6,291,972 B1 | 9/2001 | Zhang | |
| 6,384,570 B2 * | 5/2002 | Matsuyama | 320/101 |
| 6,437,539 B2 | 8/2002 | Olsson et al. | |
| 6,806,686 B1 | 10/2004 | Thrap | |
| 6,844,703 B2 | 1/2005 | Canter | |
| 6,873,134 B2 | 3/2005 | Canter | |
| 2003/0214267 A1 | 11/2003 | Long | |

* cited by examiner

*Primary Examiner*—Edward Tso
*Assistant Examiner*—Yalkew Fantu
(74) *Attorney, Agent, or Firm*—Buskop Law Group, PC; Wendy Buskop (57) ABSTRACT

A rechargeable power assembly having at least one lithium ion cell comprising an anode, a cathode, an electrolyte gel; a pulsed balancing circuit connected to the at least one lithium ion cell for maintaining the at least one lithium ion cell in a balanced phase; at least two photovoltaic cells concurrently connected to the pulsed balancing circuit and at least one lithium ion cell, wherein the at least two photovoltaic cells are connected in series for recharging the at least one lithium ion cell; an insulating layer between the at least one lithium ion cell and the at least two photovoltaic cells, wherein the at least two photovoltaic cells each have a surface for absorbing radiation, the surfaces for absorbing radiation are disposed opposite the respective insulating layers forming an apparatus for providing usable DC current directly from an electric circuit connected to the at least one lithium ion cell.

18 Claims, 5 Drawing Sheets

SOLAR PANEL WITH PULSE CHARGER

CROSS-REFERENCE TO RELATED APPLICATIONS

This application is a continuation-in-part application of prior U.S. patent application Ser. No. 11/293,432, which was filed Dec. 2, 2005 now U.S. Pat. No. 7,279,867. The U.S. patent application Ser. No. 11/293,432 is incorporated by reference herein.

FIELD

The invention relates to a rechargeable power assembly using at least two photovoltaic cells.

BACKGROUND

A need has existed for a continuously balancing photovoltaic power supply that utilizes lithium ion batteries.

A need has existed for a rechargeable power supply that is containable in one apparatus.

A need has existed for a rechargeable portable power supply that does not require additional wiring.

The present invention meets this need.

DETAILED DESCRIPTION OF THE EMBODIMENTS

The invention will be described with reference to the drawings, the detailed description, and the claims.

One of the benefits of the invention is it provides a rechargeable battery assembly that is easy to use in the field. The assembly is easy to use in the field because the lithium ion cells, photovoltaic cells, and a battery control module are encased into one assembly.

The invention is less expensive to set up because there is not a requirement for additional wiring or additional apparatuses.

The invention relates to a rechargeable power assembly. An embodiment of the assembly can be made up of at least one lithium ion cell, the lithium ion cells can be a variety that are available on the market. The lithium ion cells have an anode, a cathode, and an electrolyte. There is a battery control module connected to at least one lithium ion cell for maintaining the at least one lithium ion cell in a balanced phase.

This battery control module is made up of a balancing circuit for balancing a plurality of cells or groups of cells connected in series.

The battery pack control module can include: a controller assembly including an analog controller, such as those available from Texas Instruments of Dallas, Tex., Part Number BQ29312A, and a digital controller, such as circuitry that includes one or more analog I/O ports, one or more digital I/O ports, a processor, which could be a microprocessor, memory which can be a flash memory and processing logic located in the memory, as well as additional computer instructions in the memory for directing the processor to perform discharge of current functions when one or more measured values for temperature, current or voltage exceed or drop below a preset limit from a configuration table.

Additionally an embodiment of battery pack control module can include a disconnect circuit, including a charge switch and a discharge switch connected in series, engaging the controller assembly and the plurality of cells or groups of cells connected in series; a pack sensing circuit including a member selected from one of the following: a means for measuring battery pack system module temperature, a means for measuring battery pack system module current, a means for measuring cell voltages, or combinations thereof.

The pack sensing circuit can connect to the controller assembly and the plurality of cells or groups of cells connected in series; a balancing circuit, which includes a shunt resistor, connected to a by-pass switch.

The balancing circuit can connect between the plurality of cells or groups of cells connected in series and engages the controller assembly.

The pulsed battery pack can further include computer instructions for instructing the controller assembly to control the disconnect circuit and the balancing circuit.

The plurality of photovoltaic cells or groups of cells, which can be connected in series, are balanced when the battery pack control module operates in a charging phase, a discharging phase, a quiescent phase, or a storage phase.

The rechargeable power assembly can have at least two photovoltaic cells connected to the pulsed balancing circuit and at least one lithium ion cell. The photovoltaic cells can be connected in series for recharging the lithium ion cell or cells.

In the rechargeable power assembly, an insulating layer can be located between the lithium ion cell and the photovoltaic cells. It should be noted that the photovoltaic cells have a surface for absorbing radiation located opposite the insulating layers. The resulting apparatus provides DC current directly from an electric circuit connected to the lithium ion cells.

Figure 1:
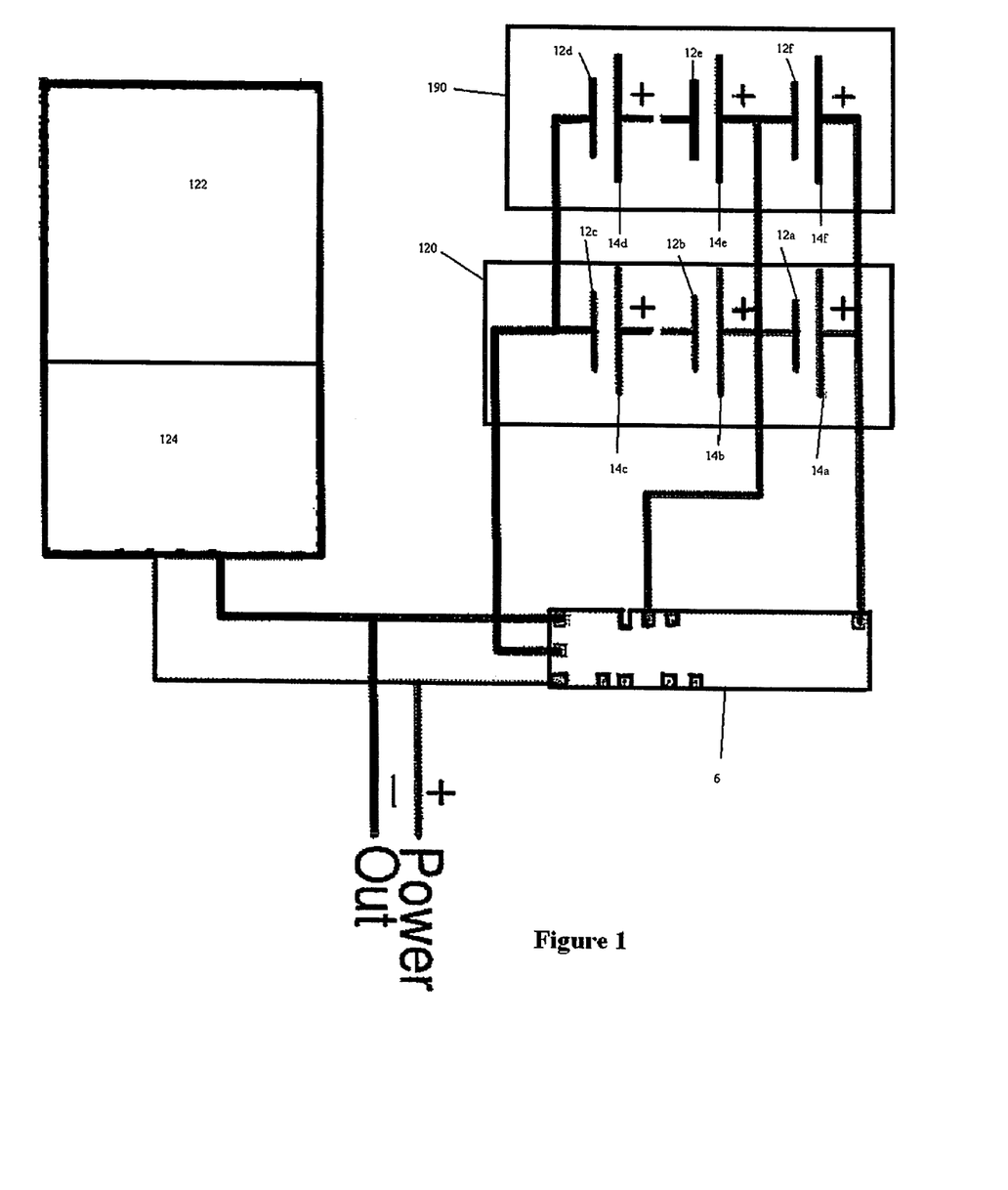
FIG. 1 is a schematic of an embodiment of the solar panel with the lithium ion cells.

Turning now to the Figures, FIG. 1 shows an embodiment of a rechargeable power assembly. Two pluralities of lithium ion cells 190, 120 are shown. The lithium ion cells making up the plurality of lithium ion cells 190 are selectively connected in series. Additionally, the lithium ion cells making up the plurality of lithium ion cells 120 are selectively connected in series. The plurality of lithium ion cells 190 are selectively connected in parallel to the plurality of lithium ion cells 120.

It is possible that in another embodiment of the invention that the plurality of lithium ion cells 190 can be selectively connected in series to the plurality of lithium ion cells 120.

It is further contemplated that in an alternative embodiment of the invention that the individual lithium ion cells forming the plurality of lithium ion cells 120 can be in parallel or a combination of parallel and series. The same is true for the individual lithium ion cells making up the plurality of lithium ion cells 190.

The plurality of lithium ion cells 190 are shown having three lithium ion cells represented by their respective cathodes and anodes. That is anode 14f and cathode 12f collectively create a lithium ion cell; and anode 14e and cathode 12e form another lithium ion cell, and anode 14d and cathode 12d form a third lithium ion cell. An electrolyte allows the flow of the electric current from the anodes to the cathodes.

The plurality of lithium ion cells 120 are shown having three lithium ion cells represented by their respective cathodes and anodes. That is anode 14a and cathode 12a collectively create a lithium ion cell; and anode 14b and cathode 12b form another lithium ion cell, and anode 14c and cathode 12c form a third lithium ion cell. An electrolyte allows the flow of the electric current from the anodes to the cathodes.

In an alternative embodiment of the invention, it is possible that the plurality of lithium ion cells 190 and 120 can be made up of more than three lithium ion cells each. The number of lithium ion cells and if they are connected in parallel or series is determined by the requirements for electric output. For example, for a nominal 11.1 volt battery, 3 cells of 3.7 volts each are connected in series. To increase the ampere hour capacity of this battery, several of these 3 series connected cell assemblies could be connected in parallel In yet another embodiment of the invention there can be more than two pluralities of lithium ion cells. For example, there can be a plurality of 5 lithium ion cells connected in series, another plurality of 6 lithium ion cells connected in series, and another plurality of 5 lithium ion cells connected in parallel. The three pluralities of lithium ion cells can be connected in parallel or series depending on the requirements for voltage and current.

A battery control module 6 selectively connects to each of the lithium ion cells. The battery control module 6 maintains the lithium ion cells in a balanced phase.

Figure 2:
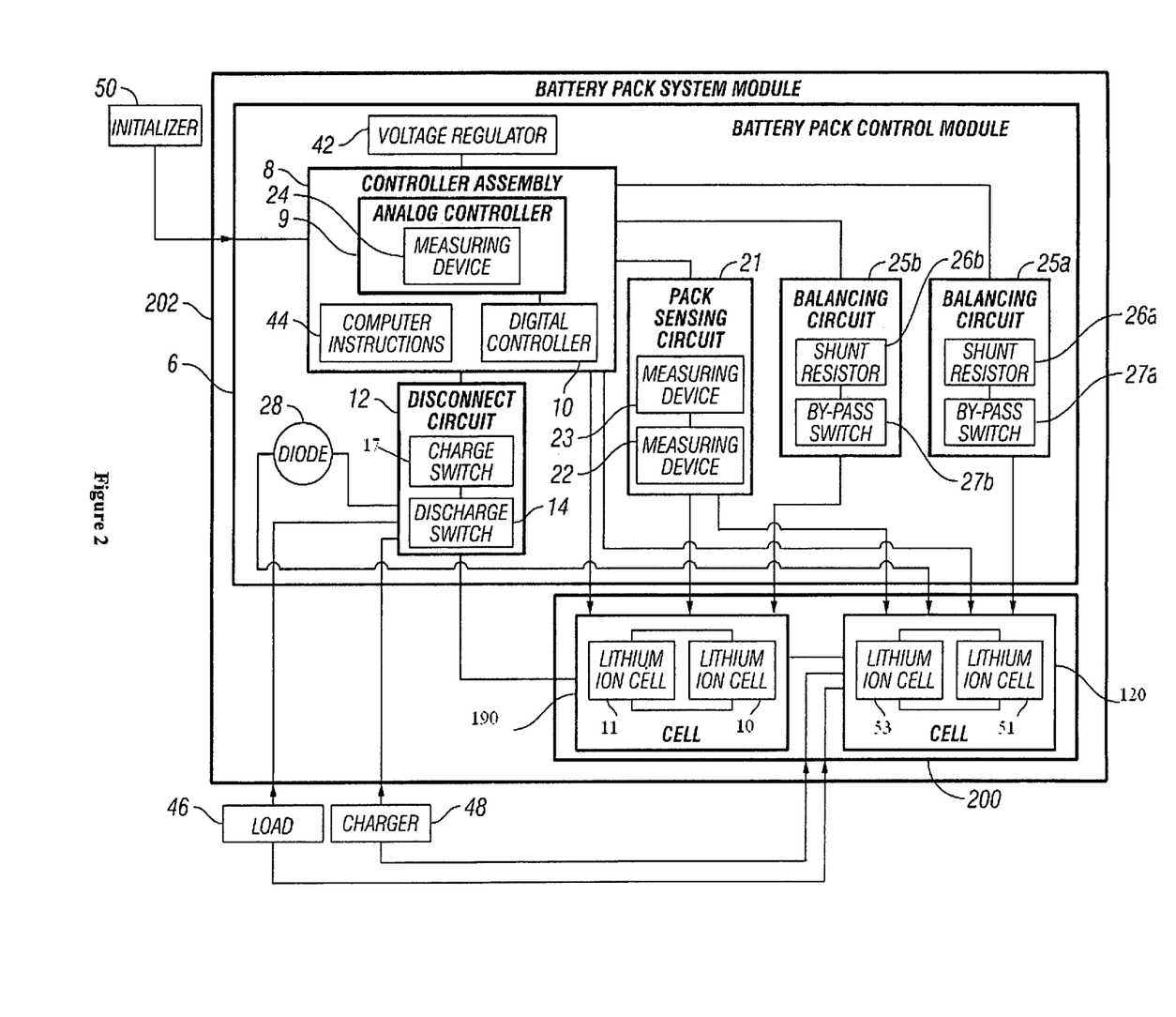
FIG. 2 is a schematic of an embodiment of the battery control module.

The battery control module is shown in more detail in FIG. 2.

FIG. 2 depicts an embodiment of a battery pack control module 6 with protective circuitry that includes a reverse voltage protection diode 28, such as those from Visshay Corp. of Malvern, Pa. The reverse voltage protection diode 28 connects to a disconnect circuit 12, as well as a group of cells connected in series 200. The battery pack control module 6 includes a controller assembly 8 connected to the disconnect circuit 12. The controller assembly 8 can communicate with a voltage regulator 42, such as a voltage regulator made by Linear Technology, Inc. of Malpitas, Calif.; and a monitor or initializer 50, such as the type made by Hewlett Packard of Palo Alto, Calif.

A balancing circuit 25a and 25b, and a pack sensing circuit 21, which can include a device for measuring battery pack temperature 22, such as a thermister; a device for measuring battery pack current 23, such as a resistor; and a device for measuring cell voltages 24, such as an analog to digital converter, or combinations thereof. A device for measuring cell voltage 24 can be used within the controller assembly 8.

The controller assembly 8 connects to the series connected groups of cells connected in parallel 190 and 120. If the device for measuring cell voltage 24 is outside of the controller assembly 8, the pack sensing circuit 21 connects directly to the series connected groups of cells connected in parallel 190 and 120, and the controller assembly 8 does not have to connect directly to the series connected groups of cells connected in parallel 190 and 120.

The controller assembly 8 can include an analog controller 9 and a digital controller 10. The controller assembly 8 can include a reverse voltage protection diode 28 to prevent excessive voltage from developing across the controller assembly 8, the voltage regulator 42, and the disconnect circuit 12.

An exemplary analog controller 9 can be one available from Texas Instruments of Dallas Tex., Part Number BQ29312A.

An exemplary digital controller 10 can be circuitry that includes one or more analog I/O ports, one or more digital I/O ports, a processor, which could be a microprocessor, memory which can be a flash memory having processing logic in the memory, and additional computer instructions in the memory for directing the processor.

The digital controller has at least one configuration table. The configuration table can be a table, groups of tables, or can be programmable data about the cells to be balanced. Additional data storage can be used in communication with the processor for storing the configuration table, as well as storing computer instructions for operating the circuitry of the balancing circuit and for storing additional data related to the configuration table. The data storage can include the monitored and measured data obtained by the battery pack control module, such as cell voltage, current and/or temperature. The monitored and measured data can be recorded and stored in a database format or a table format.

Disconnect circuit 12 can include a charge switch 17 and a discharge switch 14 connected in series. The charge switch 17 can be a transistor switch, such as a Vishay P-FET switch of Malvern, Pa. The discharge switch 14 can be the same part as the charge switch or a similar type of switch.

A lithium ion cell 11 can be connected in parallel to a lithium ion cell 10. A lithium ion cell 53 can be connected in parallel to a lithium ion cell 51. A plurality of lithium ion cells 190 connected in parallel can be connected in series to a plurality of lithium ion cells connected in parallel 120. A plurality of parallel-connected lithium ion cells 190 and 120 can be connected as groups in series 200.

In this embodiment, balancing circuits 25a and 25b can be used. Each balancing circuit 25a and 25b can include shunt resistors, 26a and 26b respectively, and bypass switches 27a and 27b respectively.

In an embodiment, the shunt resistor, such as those from Visshay Corp. of Malvern, Pa. can be used across groups of cells connected in parallel through the bypass switch.

The pack sensing circuit 21 can be used to measure any combination of cell voltages in groups of cells in series. The pack sensing circuit 21 can also be used to measure temperatures of a cell, temperatures of groups of cells, or temperatures between groups of cells. The pack sensing circuit 21 can be used to measure in groups of cells in series 200. The pack sensing circuit also has a device for measuring cell voltages 24 between cells, between groups of cells, or combinations thereof. One or more current measuring, cell voltage measuring and/or temperature measuring devices can be used in the embodiments.

Continuing with FIG. 2, the device for measuring cell voltages 24 between cells, between groups of cells or combinations thereof, can be internal to the analog controller 9. The means for measuring cell voltages can be within the analog portion of the controller assembly 8. An example of a device usable for measuring cell voltages could be a Texas Instrument analog controller that additionally measures voltage, which is available from Texas Instruments of Dallas, Tex.

The pack sensing circuit 21 can include a device for measuring battery pack temperature 22, which can be external to the controller assembly 8. This temperature sensing device can be any thermistor, such as those from CTS of Elkhart, Ind.

The pack sensing circuit 21 of FIG. 2 includes a device for measuring battery pack current 23, which can be external to the controller assembly 8. The device for measuring battery pack current can be a resistor, such as those available from Vishay of Malvern, Pa.

The balancing circuits 25a and 25b include shunt resistors 26a and 26b connected to by-pass switches 27a and 27b. The by-pass switch 27a or 27b can be a semiconductor switch, a variable resistor, a mini-micro switch or combinations of these devices. The balancing circuits 25a and 25b can be used to connect between the plurality of cells 11, 10, 53, and 51 or between the groups of parallel connected cells 196 and 120, which can be connected in series 200. The controller assembly 8 can activate balancing activity by engaging or controlling the balancing circuits 25a and 25b.

Computer instructions 44 can be used with the controller assembly 8 to direct the controller assembly 8 to activate disconnect circuit 12 to disconnect cells from a load 46 or a charger 48 and thereby enhancing the balancing of the groups in series 200, and for battery pack system module 202 safety.

The computer instructions 44 can be stored in the memory of a processor of a computer or server usable in the embodiments, which can include instructions to initialize and control the analog controller 9 for battery pack system module 202 safety and to enable or disable individual balancing circuits 25a and 25b at anytime, to keep groups of cells in series 200 continuously in balance.

The embodiments contemplate using a battery pack control module 6 with a voltage regulator 42 for powering the controller assembly 8. The voltage regulator 42 can be a DC programmable voltage regulator such as those made by Linear Technology, Inc. of Malpitas, Calif.

The embodiments contemplate that a monitor or initializer 50 can be connected to the controller assembly 8, such as the type made by Hewlett Packard of Palo Alto, Calif.

A load 46, which is also referred to herein as an application, can be connected to a battery pack system module 202. A charger 48 can be connected to the battery pack system module 202. In FIG. 2, a line is depicted around battery pack control module 6 with the plurality of cells connected in parallel, further connected in series 200, which is hereafter termed a battery pack system module 202.

Returning to FIG. 1, at least two photovoltaic cells 122 and 124, such as the type made by BP™ Solar of Fredrick, Md., which are sold, pre-mounted on a frame, or an un-mounted photovoltaic cell sold by various manufactures. The two photovoltaic cells 122 and 124 are concurrently connected to the battery control module 6. More photovoltaic cells can be connected to the battery control module 6. The two photovoltaic cells 122 and 124 are selectively connected in series for recharging the pluralities of lithium ion cells 120 and 190. Additionally, it is possible to use flexible or inflexible photovoltaic cells.

Figure 3:
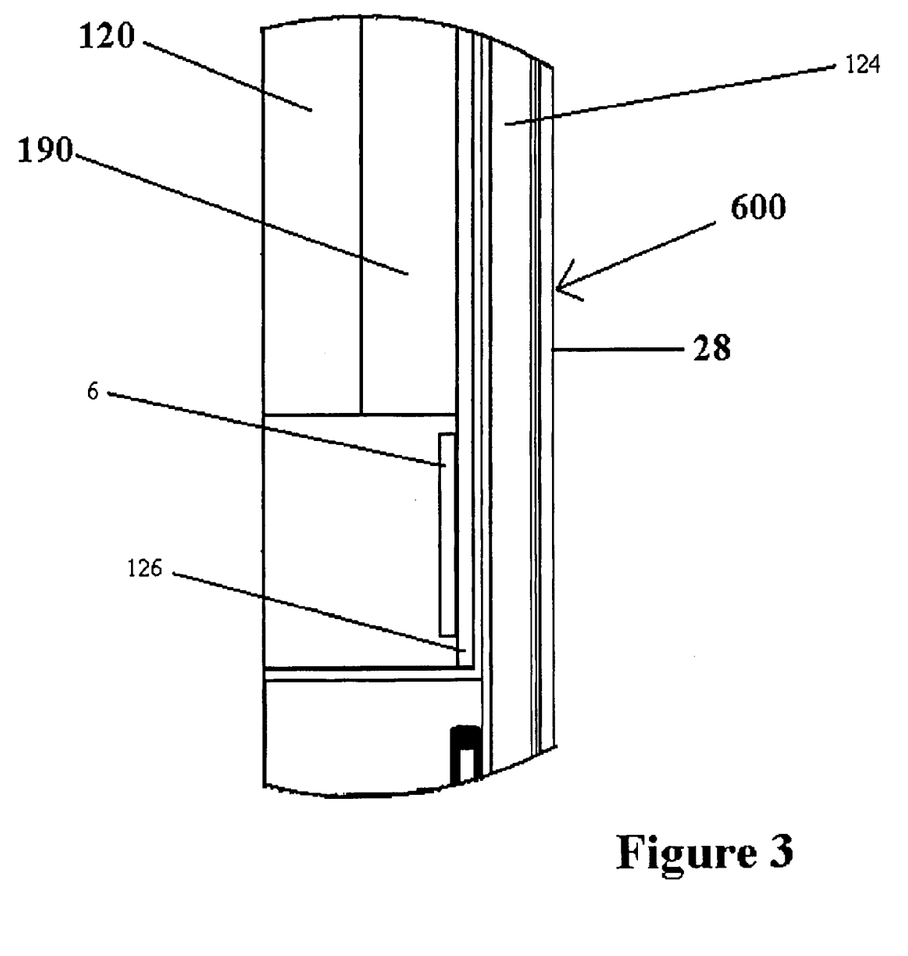
FIG. 3 is a cut view of an embodiment of the solar panel.

Referring to FIG. 3, an insulating layer 126 is selectively located between the plurality of lithium ion cells 190 and the at least two photovoltaic cells 122 (depicted in FIGS. 1 and 2) and 124. It should be noted that the at least two photovoltaic cells have a surface 28 for absorbing solar radiation element. The surfaces 28 for absorbing solar radiation are disposed opposite the insulating layers 126.

The plurality of lithium ion cells 120 is selectively located beneath the plurality of lithium ion cells 190.

In an alternative non-limiting embodiment, the plurality of lithium ion cells 190 and 120 can be made up of only one lithium ion cell depending on the electrical output requirements.

In an additional embodiment, the rechargeable power assembly 600 can further include a curable potting encapsulating the entire apparatus except for the photovoltaic cell surface for absorbing solar radiation 28. This creates an apparatus for providing direct electric current to at least one lithium ion cell from an electric circuit.

Another embodiment of the invention contemplates that the rechargeable power assembly is portable.

Yet another embodiment contemplates that the rechargeable power assembly has a plurality of lithium ion batteries connected in series, or in parallel or in combinations of in series or in parallel.

Figure 4:
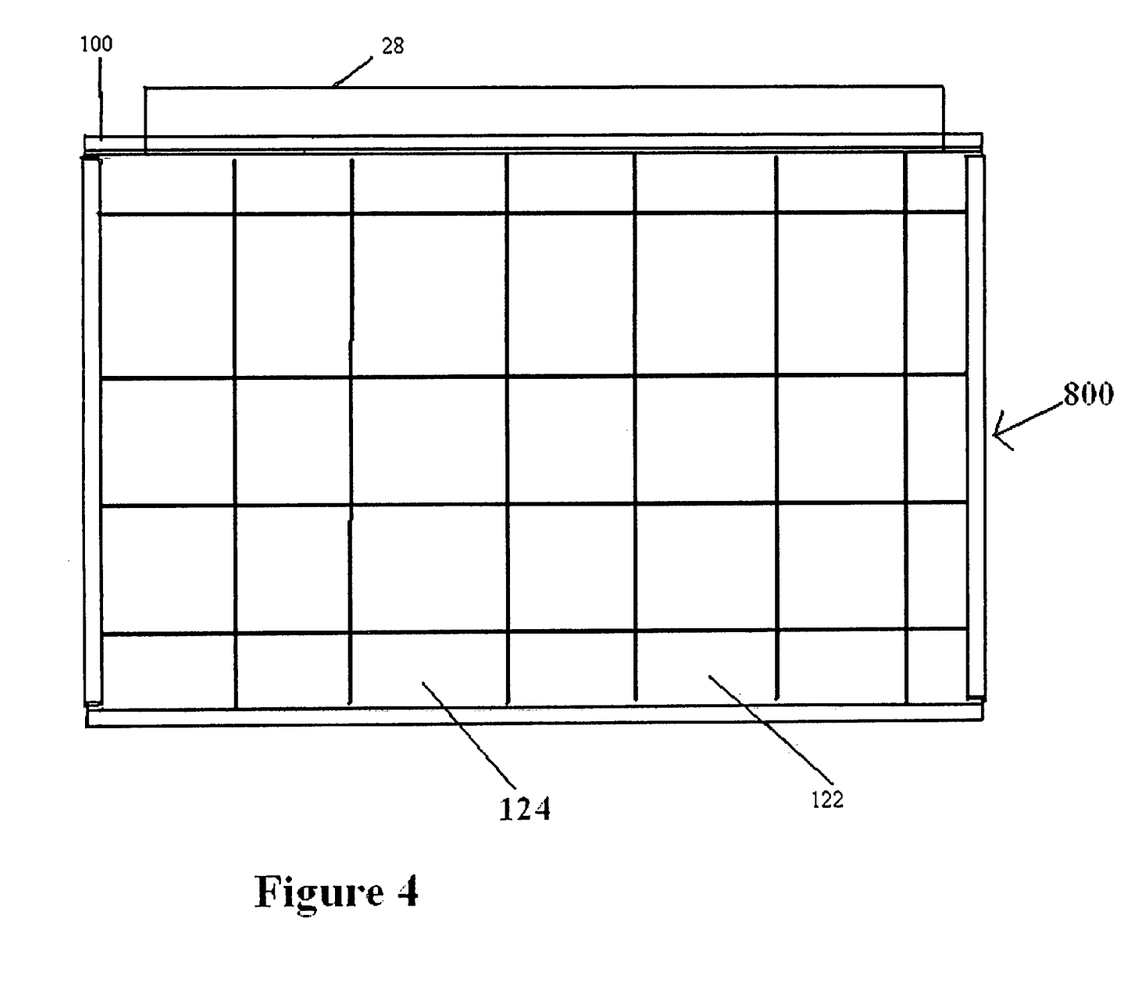
FIG. 4 is the top view of an embodiment of the solar panel.

FIG. 4 shows a top view of an embodiment of the rechargeable power assembly 600. The frame 100 is shown as well as at least two photovoltaic cells plurality 122, 124, within a plurality of photovoltaic cells 800. The solar radiation absorbing surface 28 of the at least two photovoltaic cells 122, 124 is shown in an operative position where they would be able to absorb solar radiation.

It is contemplated the rechargeable power assembly 600 can include more than two photovoltaic cells depending on the requirements for electrical output.

Figure 5:
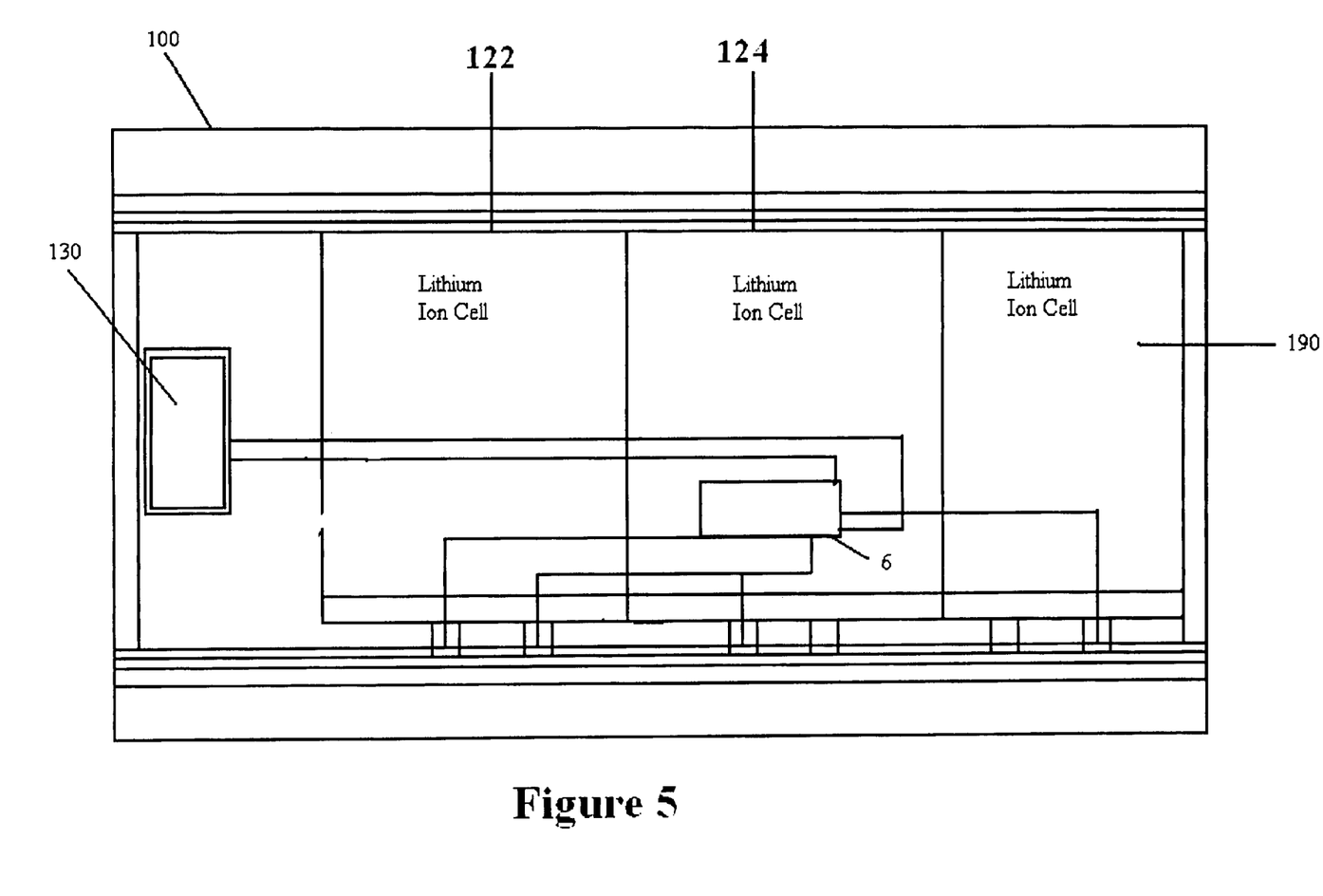
FIG. 5 is a bottom view of an embodiment of the solar panel assembly with the lithium ion cells.

FIG. 5 shows the back view of an embodiment of the assembly with a frame 100, which supports the at least two photovoltaic cells 122 and 124. The plurality of lithium ion cells 190 can be seen with the individual lithium ion cells selectively connected in series.

The at least two photovoltaic cells 122, 124 are wired to the battery control module 6 by the use of a coupling 130.

It is contemplated that the rechargeable power assembly uses lithium ion cells with a charging cycle with a depth of discharge of less than empty and a recharge of less than full. This will ensure that the lithium ion cells obtain their rated cycle life or exceed their rated cycle life.

The lithium ion cells can be a lithium ion polymer battery.

Yet another embodiment contemplates that the rechargeable power assembly 600 can be encapsulated except for the surface of the photovoltaic cells with a essentially waterproof potting coating such as an a resin, a polymer, an urethane, any other water proof insulating material, or combinations thereof. The potting coating can be cured by using air, heat, ultraviolet radiation or combinations thereof.

An embodiment of the invention contemplates that the device is a multi voltage power system having at least two unconnected lithium ion batteries, wherein each battery is separately chargeable independently from the one or more photovoltaic cells.

It is also contemplated that for the assembly, the lithium ion polymer cells and lithium ion cells can provide at least 3.67V for each cell in a series.

In an alternative embodiment of the invention, it is contemplated that the device can be portable or a fixed assembly.

For example, the assembly can be mounted on a portable device, such as a trailer to be transported to different locations, or in another embodiment of the invention, the assembly can be mounted in a permanent location.

The benefits of the invention include having photovoltaic cells and a recharging system operatively contained in one assembly. The invention eliminates the extra steps of having to interface to a separate DC charge controller. In addition, the invention eliminates the need for a battery housing.

The invention will further reduce the cost associated with photovoltaic cells by eliminating the need for extra housings and wiring.

It is further contemplated that the battery control module can have an SM bus for connecting a display, which can be an LED or LCD to the back of the frame 100. The display will have an indication, such as a percentage or bar graph, which will indicate the amount of charge in the battery.

The invention is also associated with a method for providing a pulsed balanced rechargeable power assembly.

The method includes a method for providing a pulsed balanced rechargeable power assembly, the method includes: connecting at least two photovoltaic cells each having at least one outward surface to a plurality of lithium ion cells. The plurality photovoltaic cells will recharge to a balancing circuit. The balancing circuit can balance a plurality of cells.

Then insulating between the plurality of cells and the at least two photovoltaic cells. Then absorbing solar radiation using outward surfaces of the at least two photovoltaic cells.

The absorption of the solar radiation by the surfaces of the at least two photovoltaic cells can create a plurality of charged lithium ion cells.

Power can then be discharged from the plurality of charged lithium ion cells.

The battery control module can include: monitoring and measuring parameters for a plurality of individual cells connected in parallel or groups of individual cells connected in parallel and then in series, to determine a state of charge for the individual cells connected in parallel or the individual groups of cells connected in parallel and then in series.

The monitoring and measuring step can further include measuring a temperature of the cells or the groups of individual cells, measuring current of the cells or the groups of individual cells; or measuring cell voltages of the cells or the groups of individual cells, or combinations thereof.

A portion of the charge is removed from the plurality of individual cells. The plurality of individual cells are connected in parallel or groups of individual cells connected in parallel and then in series. This is to achieve a balanced state of charge for the plurality of individual cells or groups of individual cells while in a discharge phase, a charge phase, a quiescent phase, a storage phase, or combinations of these phases.

A digital controller is used to execute computer instructions, which balance the cells. The computer instructions instruct a processor connected to the plurality of cells or groups of cells to execute the following steps: monitoring and measuring the state of charge for the plurality of cells or groups of cells; activating at least one disconnect circuit between the plurality of cells or groups of cells when the monitoring and measuring values extend beyond preset limits; and activating at least one balancing circuit to manage the removal of at least a portion of a charge from the plurality of cells or groups of cells to achieve balance.

An example of the an embodiment of the invention can include connecting two photovoltaic cells in series and wiring the two photovoltaic cells to a plurality of lithium ion cells. The connection between the two photovoltaic cells and the plurality of lithium ion cells can be accomplished by soldering or using a junction box.

The next act in the embodiment of the method can be to wire a battery pack control module to the plurality of lithium ion cells. The lithium ion cells will recharge to the balancing circuit within the battery pack control module. The balancing circuit will balance between the plurality of lithium ion cells.

An insulating layer is created between the side opposite the outward surface of the at least two photovoltaic cells and the lithium ion cells and battery control module. The insulating layer can be applied by spraying or cutting foam insulation to fit on the side opposite the outward side of the two photovoltaic cells.

The plurality of lithium ion cells and the battery control module are then disposed on the insulating layer. A structure can be used to support the two photovoltaic cells, the plurality of lithium ion cells, and the battery control module. The support can be a prefabricated frame that comes with two or more photovoltaic cells or a structure machined to a customized shape.

In this embodiment of the method, another act that can be performed is applying an encapsulating coating to the side opposite the outward facing side of the two photovoltaic cells. The encapsulating coating can be applied by potting (simply pouring the encapsulating material onto the parts to be protected and allowing the encapsulate to cure to its sold form). The coating should further fully protect the lithium ion cells and battery control module pack from the environment.

Solar radiation is absorbed by the outward facing surface of the two photovoltaic cells. When the radiation is absorbed, the plurality of lithium ion cells are charged.

The plurality of lithium ion cells are then discharged. An example of discharging the lithium ion cells would be connecting the plurality of lithium ion cells to a lighting system.

The battery control module monitors and measures the parameters of the individual lithium ion cells connected in series or in parallel, and determines the state of charge for the individual lithium ion cells connected in parallel or in series.

The monitoring and measuring includes measuring temperature by using a thermistor, measuring current in the lithium ion cells by a voltage developed across a resistor, measuring voltage of the lithium ion cells by analog to digital convertor, or combinations thereof.

A portion of the charge is removed from the plurality of lithium ion cells or individual lithium ion cells to achieve a balanced state of charge for the plurality of lithium ion cells or group of individual cells while in a discharge phase, a charge phase, a quiescent phase, storage phase, or combinations of these phases.

An example of the causing the cells to be in a balanced phase can be the cells are balanced when the capacity of each cell is determined to be equal within a small acceptable tolerance. The next act in an embodiment of the method can be using a digital controller to execute computer instructions to balance the lithium ion cells connected in series or parallel.

The computer instruction can include instruction to monitor the state of charge of the plurality of lithium ion cells, and instructions for activating at least one disconnect circuit between the plurality of lithium ion cells, when the measured values extend beyond a preset limit. For example if the temperature reaches a selective preset temperature of about 60 Celsius, then the computer instruction can cause the disconnect circuit to be activated.

An embodiment of the method can further include computer instructions for activating at least one balancing circuit to manage the removal of at least a portion of the charge from the plurality of cells or groups of cells to achieve the balanced state.

An embodiment of the method can further include operatively disposing a SM bus within the battery pack control module allowing for the connection of a display to indicate the charge of system. The display is selectively disposed on the side opposite the outward surface for operatively displaying the charge of the plurality of lithium ion cells. For example, the display can be a digital read out of numbers indicating the percentage of charge left in the plurality of lithium ion cells.

While these embodiments have been described with emphasis on the embodiments, it can be understood that within the scope of the appended claims, the embodiments might be practiced other than as specifically described herein.

What is claimed is:

1. A rechargeable power assembly comprising:
   at least one lithium ion cell comprising an anode, a cathode, an electrolyte;
   a battery pack control module for balancing a plurality of cells or groups of cells connected in series,
   wherein the battery pack control module comprises:
   a controller assembly comprising an analog controller and a digital controller; a disconnect circuit, comprising a charge switch and a discharge switch connected in series, engaging the controller assembly and the plurality of cells or groups of cells connected in series; a pack sensing circuit comprising a member selected from the group consisting of: means for measuring battery pack system module temperature, means for measuring battery pack system module current, means for measuring cell voltages, or combinations thereof; wherein the pack sensing circuit connects to the controller assembly and the plurality of cells or groups of cells connected in series;

a balancing circuit comprising a shunt resistor connected to a by-pass switch, wherein the balancing circuit connects between the plurality of cells or groups of cells connected in series and engages the controller assembly; computer instructions for instructing the controller assembly to control the disconnect circuit and the balancing circuit; and wherein the plurality of cells or groups of cells connected in series are balanced when the battery pack control module operates in a charging phase, a discharging phase, a quiescent phase, or a storage phase;

at least two photovoltaic cells connected to the battery pack control module forming an electric circuit, wherein the at least one lithium ion cell is connected to the electric circuit, wherein the at least two photovoltaic cells are connected in series for recharging the at least one lithium ion cell, wherein the at least one lithium ion cell has a cycle depth of discharge of less than empty and a recharge of less than full;

an insulating layer between the at least one lithium ion cell and the at least two photovoltaic cells, wherein the at least two photovoltaic cells each have a surface for absorbing solar radiation, wherein the surfaces for absorbing solar radiation are disposed opposite the respective insulating layer forming an apparatus for providing usable DC current directly from the electric circuit connected to the at least one lithium ion cell; and a curable potting coating encapsulating the apparatus excluding the photovoltaic cell surface for absorbing radiation.

2. The rechargeable power assembly of claim 1, further comprising: a frame supporting the photovoltaic cells on a side and the battery control module, the lithium ion cell, and the insulating layer on an opposite side of the frame, wherein a one-piece device is formed.

3. The rechargeable power assembly of claim 1, wherein the apparatus is portable.

4. The rechargeable power assembly of claim 1, further comprising a plurality of lithium ion cells connected in series, in parallel, or combinations thereof.

5. The rechargeable power assembly of claim 1, wherein the at least one lithium ion cell is a lithium ion polymer cell.

6. The rechargeable power assembly of claim 1, wherein the potting coating is a resin, a polymer, an urethane, any other type of water proof insulating material, or combinations thereof.

7. The rechargeable power assembly of claim 1, wherein the potting coating is cured by air, heat, ultraviolet radiation, or combinations thereof.

8. The rechargeable power assembly of claim 1, wherein the at least two photovoltaic cells are flexible cells.

9. The rechargeable power assembly of claim 1, wherein the apparatus is a multi voltage power system comprising at least two unconnected lithium ion cells each chargeable independently from the at least two photovoltaic cells.

10. The rechargeable power assembly of claim 1, wherein the at least one lithium ion cell provides 3.67V.

11. The rechargeable power assembly of claim 1, wherein the battery control module comprises a SM bus allowing the connection of a display to indicate the charge of system.

12. A method for providing a pulsed balanced rechargeable power assembly, wherein the method comprises:
    connecting at least two photovoltaic cells each having at least one outward surface for absorbing solar radiation to a plurality of cells, for recharging to a battery pack control module for balancing the plurality of cells;
    wherein the battery pack control module comprises:
    monitoring and measuring parameters for a plurality of cells, to determine a state of charge for the individual cells; wherein the monitoring and measuring step further comprises:
    measuring a temperature of the plurality of cells;
    measuring current of the plurality of cells;
    measuring cell voltages of the plurality of cells;
    or combinations thereof;
    creating an insulating space between the side opposite the outward surface of the at least two photovoltaic cells and the battery pack control module and the plurality of cells;
    disposing the plurality of cells and the battery pack control module on the insulated space on the side of the at least two photovoltaic cells opposite the outward surface;
    encapsulating the apparatus excluding the photovoltaic cell surface for absorbing radiation with a curable potting;
    absorbing solar radiation using outward surfaces of the at least two photovoltaic cells to create a plurality of charged cells;
    discharging power from the plurality of charged cells; and
    removing at least a portion of a charge from the plurality of cells to achieve a balanced state of charge for the plurality of individual cells while in a discharge phase, a charge phase, a quiescent phase, a storage phase, or combinations of these phases;
    using a digital controller to execute computer instructions to balance the plurality of cells, wherein the computer instructions instruct a processor connected to the plurality of cells to execute the steps comprising:
    monitoring and measuring the state of charge for the plurality of cells;
    activating at least one disconnect circuit between the plurality of cells, when the monitoring and measuring values extend beyond preset limits; and
    activating at least one balancing circuit to manage the removal of at least a portion of the charge from the plurality of cells to achieve the balanced state.

13. The method of claim 12, wherein the plurality of cells are at least two lithium ion cells.

14. The method of claim 13, wherein the at least two lithium ion cells are connected in series.

15. The method of claim 13, wherein the at least two lithium ion cells are connected in parallel.

16. The method of claim 13, wherein the at least two lithium ion cells are connected in a combination of parallel and series.

17. The method of claim 12, wherein the battery control pack module comprises a SM bus allowing the connection of a display to indicate the charge of system.

18. The rechargeable power assembly of claim 1, wherein the lithium ion cell and the battery pack control module are disposed on the insulating layer.

* * * * *